No. 823,338. PATENTED JUNE 12, 1906.
A. LARSEN.
BEET CULTIVATOR.
APPLICATION FILED NOV. 7, 1905.
2 SHEETS—SHEET 1.
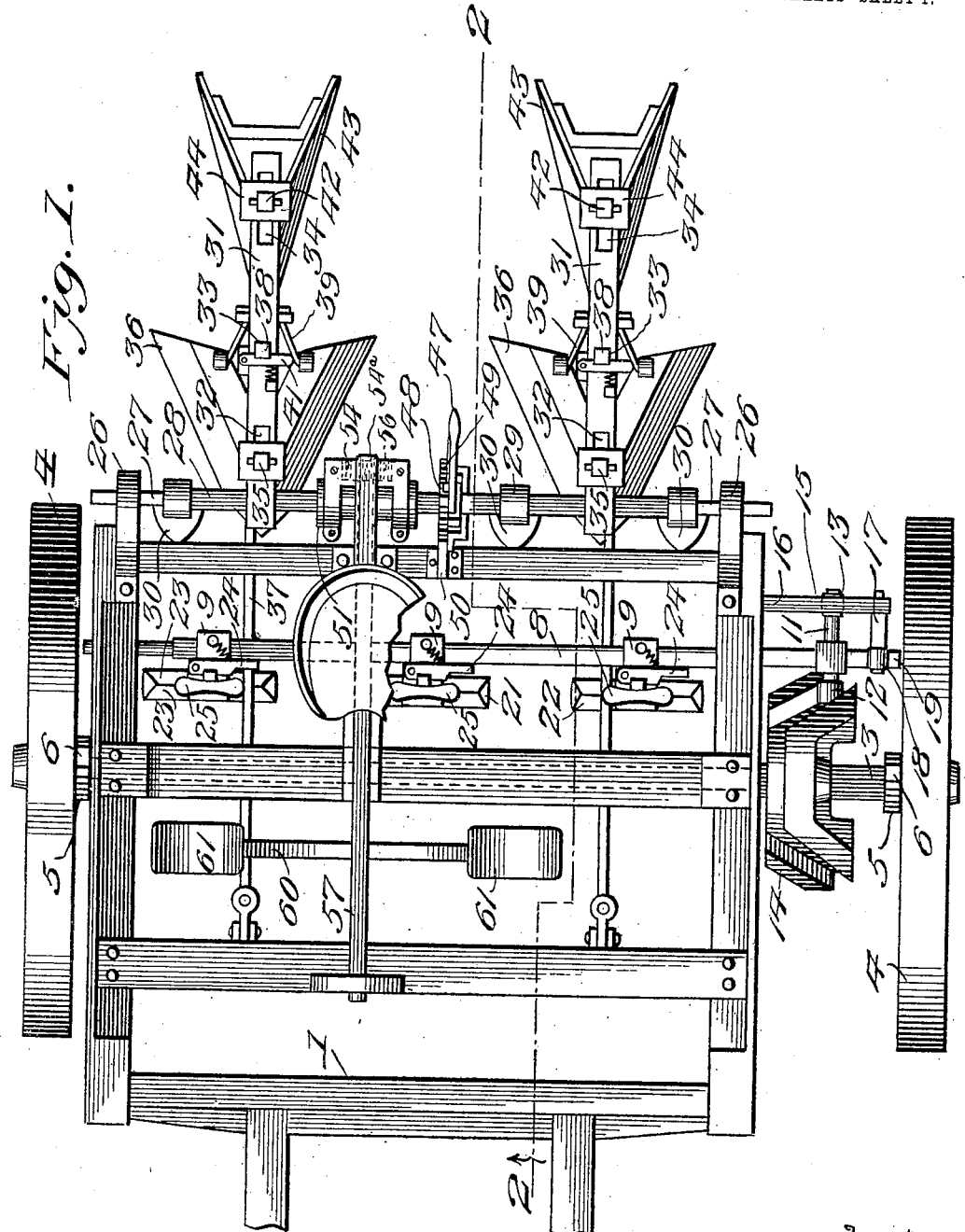
Witnesses
Edwin F. McKee
C. C. Hines
Inventor
Andree Larsen
By Victor J. Evans
Attorney

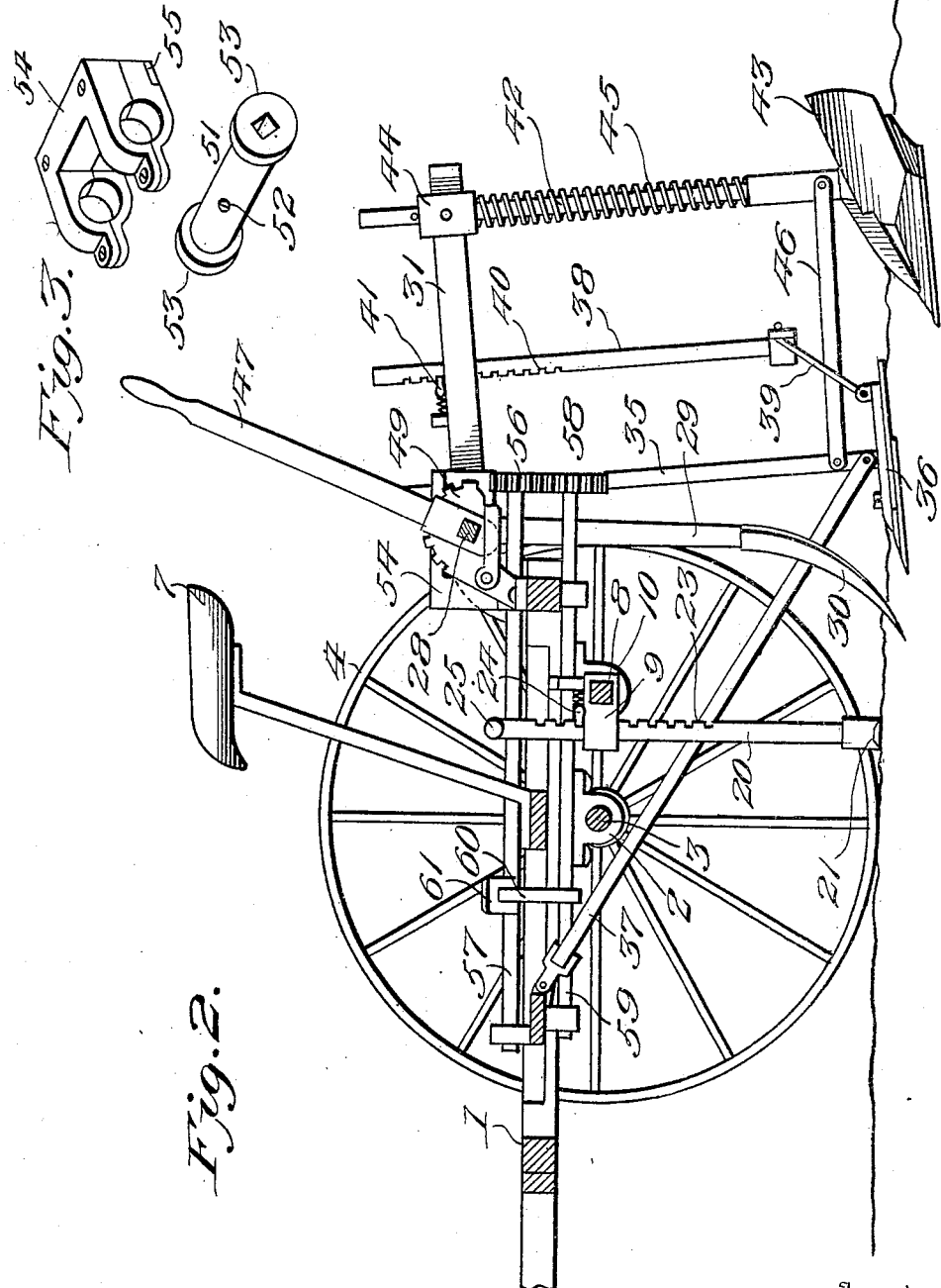

UNITED STATES PATENT OFFICE.

ANDREE LARSEN, OF STIRLING ALTA, CANADA.

BEET-CULTIVATOR.

No. 823,338.
Specification of Letters Patent.
Patented June 12, 1906.

Application filed November 7, 1905. Serial No. 286,304.

*To all whom it may concern:*

Be it known that I, ANDREE LARSEN, a subject of the King of Great Britain, residing at Stirling Alta, North-West Territories, Canada, have invented new and useful Improvements in Beet-Cultivators, of which the following is a specification.

This invention relates to improvements in beet-cultivators.

The object of the invention is to provide a construction of cultivator by which the beets may be conveniently and simultaneously blocked and cultivated and wherein the operating parts are made readily adjustable to suit different conditions of service.

In the accompanying drawings, Figure 1 is a top plan view of a beet blocker and cultivator constructed in accordance with my invention. Fig. 2 is a vertical longitudinal section thereof on line 2 2 of Fig. 1. Fig. 3 is a detail perspective view of the rack-toothed yoke, coöperating sleeve, and adjacent portion of the beam-carrying bar in disassociated relation.

Referring now more particularly to the drawings, the numeral 1 designates the supporting-frame, preferably rectangular in form and provided with hangers 2, in which a transverse axle 3 is journaled. The axle extends beyond the sides of the frame, and upon the ends thereof supporting-wheels 4 are loosely mounted. The axle receives motion from the wheels, the hubs of the latter being provided with ratchet-teeth 5 for engagement with dogs 6, carried by the axle, whereby provision is made in the usual manner to permit turning of the cultivator. A driver's seat 7 is suitably supported upon the frame.

Fixed to a bar 8 in rear of the axle are guide-brackets 9, three in number, arranged, respectively, in the center and on opposite sides of the center line of the frame. The bar 8 extends transversely of the frame and is arranged to reciprocate in bearings 10 and carries at one end a transverse guide-pin 11, carrying rollers 12 and 13. The roller 12 travels in the groove of an operating-cam 14, fixed to the adjacent end of the axle 3, whereby in the movement of the machine the bar 8 will be reciprocated. The roller 13 travels as the bar reciprocates in a guide-slot 15, formed in a stationary guide-bracket 16, which bracket carries at its outer end an arm 17, provided with a friction-roller 18 to engage the beveled outer extremity 19 of the bar at the limit of outward motion of the latter for a purpose presently described. The brackets 9 are apertured to form vertical guide-passages for the reception of the shanks 20 of vertically-adjustable blocking or thinning knives 21, 22, and 23, which accordingly coincide with reference to their arrangement to the center line of the frame with the brackets. Each shank 20 is provided with rack-teeth 23, adapted to be engaged by a spring-actuated dog or pawl 24, carried by its supporting-bracket, whereby the knives may be vertically adjusted relative to the ground-line and blocked in adjusted position. Each shank is further provided at its upper end with a handle 25, by which it may be conveniently manipulated by the driver on the seat 7. When the bar 8 is reciprocated, the cutters will reciprocate therewith transversely of the frame to thin out and block the plants in the row in the manner readily understood. By arranging the blocking-knives as shown and described one of the terminal knives of the series, such as the knife 22, may be elevated out of operation when the cultivator is traveling in one direction over the field, while said terminal cutter may be lowered and the other terminal cutter 23 raised when the cultivator is traveling in the opposite direction. Thus the central blocking-knife and one or the other of the terminal cutting-knives of the series will be simultaneously operated while the other cutting-knife remains inactive, thus providing for a proper arrangement and operation of the knives across a row when the cultivator is respectively traveling up and down the rows.

It will be observed that the arm 17 reinforces the guide-pin 11 in the action of guiding the bar 8 at the limit of outward motion of said bar under the operation of the cam, and it will be understood that in course of time the bearings and guide members become worn and allow the bar to have some vertical play. Hence when the blocking-knives strike and ride over lumps and other obstructions an upward pressure is exerted upon the bar under which the bar may be lifted in its bearings sufficiently to cause the outer end of the bar, if it were unprovided with the beveled surface 19, to strike against the roller 18 at the limit of outward motion of the bar and damage said roller or derange the operating mechanism. By, however, providing the beveled surface 19, the lip of which normally lies below the plane of the roller 18, the end of the bar will be at all times guided into contact with the under side of said roller, and shocks and jars prevented.

Arranged at the rear of the frame are bearings 26, in which the rounded ends or journals 27 of an angular supporting-bar 28 are fitted to turn and slide. Fixed to said bar are the shanks 29 of cultivator teeth or shovels 30, which operate in the usual way to loosen the soil about the plant. Also fixed to said bar is a pair of beams 31, arranged on opposite sides of the center of the frame and projecting rearwardly from the bar. Each of these beams is provided with vertical guide-slots 32, 33, and 34. The forward slot 32 receives the shank 35 of a weed-cutter and ridge-forming blade 36, which latter is pivotally connected to the lower end of said shank, the shanks of the two blades being pivotally connected at their lower ends by supporting-links 37 to the forward cross-bar of the frame, the links being so connected to said bar as to have both vertical and lateral pivotal movement. The slot 33 receives a vertically-movable hanger-bar 38, jointed at its lower end to the rear end of the cutter 36 by links 39 and provided at its upper end with rack-teeth 40, adapted to be engaged by a spring-actuated dog or pawl 41, carried by the beam to permit the hanger-bar to be locked in a variety of adjusted positions to stay and support the cutter when the latter is adjusted to operate at a desired depth below the surface of the ground.

The slot 34 receives the upper end of a shank 42, supporting at its lower end a plow or shovel 43, adapted to throw the earth about the cultivated plant. Arranged about this shank between the shoulder thereon and the beam 31 or a sleeve 44, secured thereto, is a coiled spring 45, which normally holds and forces the shovel into the earth and maintains it in position to operate at the required depth of penetration. Slots 32 and 34 are elongated to permit the shanks 35 and 42 to have vertical sliding and front to rear pivotal movement, and said shanks are joined and stayed at their lower ends by a connecting-link 46, which adapts them to have proper relative adjusting motion. Fixed to the bar 28 is a lever 47, carrying a spring-actuated pawl 48, adapted to engage a rack 49, carried by a bracket 50, fixed to the rear cross-bar of the frame, whereby the bar 28 may be oscillated to simultaneously raise and lower the cultivator-shovels, weed-cutters, and plows for working at different depths and to throw them into and out of operation.

The supporting-bar 28 is adjustable longitudinally in its bearing 26 to enable the cultivator-shovels, weed-cutters, and plows to be shifted laterally to work in different positions relative to the rows and center line of the frame, and to this end the bar 28 is provided with a sleeve 51, non-rotatably mounted thereon and fixed against sliding movement by a set-screw 52, said sleeve having terminal heads 53. Embracing this sleeve between the heads are the arms of a yoke 54, suitably made in sections, so that it may be conveniently applied and removed, said yoke being held from upward pivotal movement by an overlying stop-arm 54ª, bearing against the same and fixed to the frame 1. The body of this yoke is formed with rack-teeth 55, engaged by a pinion 56 on the rear end of a shaft 57, extending longitudinally of and suitably journaled on the frame. The gear 56 meshes with and is driven by a gear 58, carried by a shaft 59, arranged below and mounted similar to the shaft 57. A lever 60 extends transversely of and is suitably fixed centrally to the shaft 59 and provided with terminal pedals or foot-pieces 61, arranged so as to be manipulated by the feet of the driver from his position on the seat 7. By this means motion may be communicated to shift the bar 28 and working devices carried thereby laterally in either direction, and the arrangement of the actuating-gearing is such as to permit this operation to be accomplished without throwing unnecessary strain on the feet of the operator when such devices are in action.

From the foregoing description, taken in connection with the accompanying drawings, the construction and mode of operation of the device will, it is thought, be readily understood and its advantages appreciated by those versed in the art.

Having thus described the invention, what is claimed as new is—

1. In a beet-harvester, the combination of a frame, a transverse supporting-bar slidably and pivotally mounted thereon, cultivator-shovels carried by the bar, beams also carried by the bar, cutting and earth-throwing devices carried by each beam, and each having a shank pivotally and adjustably attached to the beam, means connecting the devices to move in unison, a pressure-spring acting on the shank of the earth-throwing device, locking means for holding said devices in vertically-adjustable position, and means for oscillating and sliding the transverse bar.

2. In a beet-harvester, the combination of a frame, a transverse supporting-bar slidably and pivotally mounted thereon, beams carried by the bar, cutting and earth-throwing devices carried by each beam, and each having a shank pivotally and vertically adjustably attached to the beam, a link connecting the shanks of said devices to move in unison, a pressure-spring acting on the shank of the earth-throwing devices, locking means for holding said devices in adjusted position, an intermediate bar adjustably connected with the beam, a link connecting said bar with the cutting device, and means for oscillating and sliding the transverse bar.

3. In a beet-harvester, the combination of a frame, a transverse supporting-bar slidably and pivotally mounted thereon, a sleeve non-rotatably mounted upon the bar and provided with terminal heads, a rack-yoke carried by said sleeve, a gear engaging the rack, means for actuating the gear to slide the rack and bar in either direction, means for rocking the bar, and cultivating devices supported by the bar and adjustable vertically and laterally through the action thereof.

4. In a beet-harvester, the combination of a frame, a transverse supporting-bar slidably and pivotally mounted thereon, cultivator-shovels carried by the bar, beams also carried by the bar, cutting and earth-treating devices carried by each beam, each having a shank pivotally and vertically adjustably attached to the beam, a link connecting the shanks of said devices to move in unison, a pressure-spring acting on the shank of the earth-throwing device, an intermediate bar vertically adjustable on the beam, a link connecting said bar with the cutting device, locking means for holding said shanks and intermediate bar in adjusted position, means for locking the supporting-bar to vertically adjust the devices, and rack and pinion mechanism for sliding said bar to laterally adjust said devices.

In testimony whereof I affix my signature in presence of two witnesses.

ANDREE LARSEN.

Witnesses:
W. H. SPACKMON,
D. J. CESTLEY.